United States Patent [19]

Cherukuri et al.

[11] Patent Number: 4,518,615

[45] Date of Patent: May 21, 1985

[54] NON-ADHESIVE CHEWING GUM BASE COMPOSITION

[75] Inventors: Subraman R. Cherukuri, Towaco; Ellen Marschall-Helman, Somerset, both of N.J.; Frank T. Hriscisce, Astoria, N.Y.

[73] Assignee: Warner-Lambert Company, Morris Plains, N.J.

[21] Appl. No.: 525,774

[22] Filed: Aug. 23, 1983

[51] Int. Cl.³ ............................................. A23G 3/30
[52] U.S. Cl. ......................................... 426/4; 426/6
[58] Field of Search ........................................ 426/3-6

[56] References Cited

U.S. PATENT DOCUMENTS 3,159,491 12/1964 Mahan .................................... 426/6
3,285,750 11/1966 Ishida et al. ............................. 426/6
4,352,822 10/1982 Cherukuri et al. ..................... 426/4
4,357,355 11/1982 Koch et al. ............................. 426/4
4,387,108 6/1983 Koch et al. ............................. 426/4

FOREIGN PATENT DOCUMENTS 1154237 5/1963 Fed. Rep. of Germany .......... 426/3

Primary Examiner—Jeanette Hunter
Attorney, Agent, or Firm—Gary M. Nath; C. A. Gaglia, Jr.

[57] ABSTRACT

A chewing gum base composition that does not adhere to dentures, removable and fixed oral prostethic devices, fillings or natural teeth. The chewing gum base composition includes an elastomer, elastomer solvent, polyvinyl acetate, emulsifier, low molecular weight polyethylene, waxes, plasticizer and fillers.

20 Claims, No Drawings

NON-ADHESIVE CHEWING GUM BASE COMPOSITION

The present invention relates to chewing gum base compositions and more particularly to chewing gum compositions that do not adhere to dentures, removable and fixed oral prostethic devices, fillings or natural teeth.

Chewing gums generally contain a water-insoluble gum base, a water soluble flavoring liquid and water soluble sweeteners such as sucrose and corn syrup or in sugarless gum, sorbitol, mannitol and artificial sweeteners. Also incorporated within the gum base may be plasticizers or softeners to improve consistency and texture of the gum. The gum base generally contains a natural rubber gum base, a synthetic rubber gum and or mixtures thereof. When synthetic gum bases are employed, a readily available and preferred elastomer component has been the styrene-butadiene copolymer (SBR).

Several deficiencies with conventional chewing gums have existed, noteable their tendency to be tacky and adhere to dental surfaces, including natural teeth, fillings or dentures.

Various efforts have been made to modify the well known gum base formulations, by either the deletion of certain common ingredients or the inclusion of other ingredients, in each case requiring adjustment of the gum base to assure the maintenance of desired gum characteristics.

One of the first formulations is described by Barker in U.S. Pat. No. 2,076,112. The Barker patent discloses that chewing gum containing talc does not stick to the teeth or to the interior of the person's mouth. In British Pat. No. 1,025,958 to Wm. Wrigley Company an adhesive chewing gum is disclosed. The chewing gum is shown to use pure tannic acid to produce chewing gum which will not adhere to acrylic surfaces in the mouth.

In U.S. Pat. No. 3,984,574 to Comollo a non-tack chewing gum is disclosed which contains as the preferred elastomer a low molecular weight polyisobutylene (molecular weight of 6,000 to 12,000), and/or a higher molecular weight polyisobutylene (molecular weight of 40,000 to 120,000). It is also disclosed that other elastomers may be employed in place of or together with the polyisobutylene, namely, polyisoprene, a copolymer of isobutylene and isoprene, or the copolymer of butadiene and styrene. Comollo indicates in Column 7 beginning at line 7 that it was discovered that combinations of natural gums, natural resins, rosin derivatives and resins of waxes of petroleum origin, natural gums, natural or synthetic rubbers, and resins, and natural gums, natural or synthetic rubbers and waxes, or combinations of rubbers, waxes and resins produce inherently tacky chewing gum bases and such combinations should be avoided. In addition to the references elastomers, the Comollo chewing gum contains hydrogenated vegetable oils or animal fats, polyvinyl acetate having a molecular weight of at least 2,000, and fatty acids, such as stearic and palmitic acid, and mono and diglycerides of fatty acids. The Comollo reference teaches the essential presence of mineral adjuvants, such as calcium carbonate, talc or tricalcium phosphate. This disclosure is consistent with the earlier prior art disclosing the essential presence of mineral fillers as one of the ingredients to obtain non-stick properties in chewing gum.

U.S. Pat. No. 3,974,293 to Witzel discloses a non-adhesive chewing gum which contains titanium dioxide, various detackifying agents, viscosity modifying agents and wetting agents. The reference employs high amounts of fillers, namely 8 to 50% by weight of the gum base. Exemplary fillers include calcium carbonate and talc.

U.S. Pat. No. 4,357,355 to Koch et al is likewise directed to a non-stick bubble gum base composition that can contain non-SBR elastomers. In particular, this patented non-adhesive bubble gum base composition includes a high molecular weight vinyl polymer such as polyvinyl acetate or polyvinyl alcohol, together with an emulsifier, in combination with ingredients such as an elastomer, an oleaginous plasticizer, an elastomer solvent, mineral adjuvants, fatty acids, and others. The polyvinyl acetate employed by Koch et al has an average molecular weight of about 38,000 to about 94,000 which material is preblended with the gum base elastomers prior to incorporation of the remaining base ingredients. Koch et al specifically disclose the presence of 5 to 25% by weight of mineral adjuvants, such as calcium carbonate and talc.

U.S. Pat. No. 4,387,108 to Koch et al is directed to a non-stick chewing gum composition which contains the following ingredients:

| Elastomer | 8-30% |
| --- | --- |
| Oleaginous Plasticizer | 9-40% |
| Mineral Adjuvants | 10-15% |
| Non-toxic Vinyl Polymer | 16-32% |
| Emulsifier | 0.5-10% |
| Elastomer Solvent | 2.5-13% |

The vinyl polymer of Koch et al is maybe having a molecular weight of from 3,000 to about 94,000 and included molecular weights on the order of 10,000 to 40,000 as well as 50,000 to 75,000.

While the prior art compositions have been effective to make non-stick or tack free bubble and chewing gums, these formulations have been unable to have incorporated therein higher flavor levels because of the use of fillers and texturizers which have heretofore imparted good lubricant and flavor release properties. It has been believed that the use of fillers and texturizers was essential to obtain a drier product that would exhibit non-stick characteristics to dentures.

It would therefore be desirable to develop a non-adhesive chewing gum base composition that offers an improvement in the reduction of gum stickiness, without the need for substantial or expensive modifications to gum base formulations while permitting use of higher flavor levels. It would also be desirable to develop a method for preparing a chewing gum base composition, that yields an improved uniform product without the need for observing intricate or critical process parameters.

In accordance with the present invention a chewing gum base composition has been discovered which not only alleviates the adhesion properties of conventional formulations but also imparts higher flavor levels which aid in initial and long lasting flavor impact and perceived breath freshening power. Breath freshening power is one feature that makes a chewing gum product appealing to denture wearers because of denture breath, that is, halatosis, which is associated with denture wearers due to food retained between the palate and the denture.

A chewing gum base that will not stick to dental work i.e., dentures, removable and fixed oral prostethic devices (bridges, partials, caps, crowns, etc.) filing or natural teeth which in addition delivers strong flavor impact and a large amount of perceived breath freshening power has been developed. The formulation is based on a unique combination of conventional chewing gum base ingredients which employs essential no filler component.

The chewing gum compositions of this invention exhibit rapid processing resulting from a rapid setting base formulation and easy processing and handling resulting from the compositions soft and pliable chewing gum consistency. In addition, the resulting chewing gum compositions have a consistent chew, that is a uniform chew character throughout the chewing period coupled with a higher level of flavor impact.

In a preferred embodiment, the non-adhesive chewing gum base composition, comprises, in weight percent
(a) elastomer in the amount of about 10 to about 30%,
(b) elastomer solvent in the amount of about 2 to about 18%,
(c) polyvinyl acetate having a medium average molecular weight of 15,000 to 30,000 in the amount of about 15 to about 45%,
(d) an emulsifier in the amount of about 2.0 to about 10%,
(e) low molecular weight polyethylene having an average molecular weight of at least 2,000 in the amount of about 0.5 to about 15%,
(f) waxes having a melting point above about 170° F. in the amount of about 0.5 to about 10%,
(g) plasticizer in the amount of about to 10 to about 40%, and
(h) fillers in the amount of 0 to about 5%.

In a second preferred embodiment Applicants have unexpectedly discovered a process for preparing a non-adhesive chewing gum base composition which comprises:
A. Providing the following ingredients in amounts expressed in percent by weight:
(a) elastomer in the amount of about 10 to about 30%,
(b) elastomer solvent in the amount of about 2 to about 18%,
(c) polyvinyl acetate having a medium average molecular weight of 15,000 to 30,000 in the amount of about 15 to about 45%,
(d) an emulsifier in the amount of about 2.0 to about 10%,
(e) low molecular weight polyethylene having an average molecular weight of at least 2,000 in the amount of about 0.5 to about 15%,
(f) waxes having a melting point above about 170° F. in the amount of about 0.5 to about 10%,
(g) plasticizer in the amount of about 10 to about 40%, and
(h) fillers in the amount of 0 to about 5%.
B. Agitating said elastomer by high shear mixing;
C. adding said elastomer solvent to the elastomer of step B to form a first mixture; and
D. adding to said mixture, the remainder of said ingredients;
E. wherein all of said ingredients are mixed with each other under agitation.

The elastomer may be selected from the group consisting of synthetic gums, synthetic elastomers, natural gums, natural elastomers and mixtures thereof.

The elastomers useful in the present gum base composition, include those elastomers normally included in gum bases. Illustrative elastomers include synthetic gums or elastomers such as butadiene-styrene copolymers, polyisobutylene and isobutylene-isoprene copolymers; natural gums or elastomers such as chicle, natural rubber, jelutong, balata, guttapercha, lechi caspi, sorva or mixtures thereof. Among these polyisobutylene, isobutylene-isoprene copolymer or mixtures thereof are preferred.

A preferred elastomer includes a mixture of isobutylene-isoprene copolymer and polyisobutylene. The isobutylene-isoprene copolymer represents commercially available material available from a number of suppliers. This material is used in combination with polyisobutylene which has an average molecular weight up to 1.1 million and is preferably of low molecular weight, normally from 37,000 to about 87,000 (determined by the Flory method). The low molecular weight polyisobutylene component may be used as a single polyisobutylene material or combination of different polyisobutylene compounds provided each has a molecular weight within the range defined. The use of a combination of elastomers has been found beneficial to achieve a chewing gum composition having the desired elasticity and texture.

The elastomer content employed is in an amount of about 10 to about 30%, and preferably about 20 to about 28% by weight of the gum base. When the total amount of elastomer is below 10% the base composition lacks elasticity, chewing texture, and cohesiveness whereas at amounts above 30% the formulation is hard and rubbery.

The gum base composition contains elastomer solvents to aid in softening the rubber component. Such elastomer solvents may comprise methyl, glycerol or pentaerythritol esters of rosins or modified rosins, such as hydrogenated, dimerized or polymerized rosins or mixtures thereof. Examples of elastomer solvents suitable for use herein include the pentaerythritol ester of partially hydrogenated wood rosin, pentaerythritol ester of wood rosin, glycerol ester of partially dimerized rosin, glycerol ester of polymerized rosin, glycerol ester of tall oil rosin, glycerol ester of wood rosin and partially hydrogenated wood rosin and partially hydrogenated methyl ester of rosin; terpene resins including polyterpene and polymers of α-pinene or β-pinene and mixtures thereof. The elastomer solvent may be employed in an amount ranging from about 2% to about 18% and preferably about 5% to about 10% by weight of the gum base. Amounts below about 2% cause the unacceptable chew characteristics. Amounts above 18% cause a soft product to be formed which results in a product which sticks to dental surfaces.

Polyvinyl acetate is an essential ingredient in the chewing gum base compositions of this invention. Preferably the polymer posses an average molecular weight ranging from 15,000 to 30,000. The polyvinyl acetate is employed in amounts of about 15 to about 45% by weight of the base and preferably about 20% to about 30% by weight of the base. Amounts below about 15% cause the base to be unstable and result in nonuniform flavor release. Amounts above 45% causes the product to be hard and plastic. Polyvinyl acetates having molecular weights outside this range are not effective in the formulations of this invention. In particular, PVA below about 15,000 molecular weight results in a soft tacky product which disintegrates easily upon chewing.

It is essential to employ an emulsifier in the formulation such as glyceryl monostearate, lecithin fatty acid monoglycerides, diglycerides, triglycerides, propylene glycol monostearate and mixtures thereof. Glyceryl monostearate is most preferred. When absent the formulation has poor stability and lacks acceptance texture. It is believed that the emulsifier aids in bringing the normally immiscible constituents together in such a way that they form a single finely dispersed stable system. This emulsifier improves hydrophilic character. The emulsifier is employed in amounts of about 2% to about 10% and preferably about 4% to about 6% by weight of the base. It has been found that some emulsifiers conventionally used result in the formation of unacceptable base formulations which form sticky products. Exemplary non-useable emulsifiers include glyceryl triacetate.

A third essential ingredient is low molecular weight polyethylene. The polyethylene preferably has a melting point of at least 200° F. and preferably about 220° F. and has an average molecular weight of at least 2000. When absent the formulation does not possess non-stick properties and is completely unacceptable for use herein. The polyethylene is employed in amounts of about 0.5 to about 15% and preferably 2 to 7% by weight of the base. Amounts below 0.5% result in a sticky product whereas amounts above 15% result in a hard, plastic product.

The gum base formulation must employ a wax material. The waxes have been found to soften the rubber elastomer mixture and improve elasticity of the chew character. The waxes employed are preferably microcrystalline wax, natural wax, petroleum wax, and mixtures thereof. Paraffin wax is not useable in this invention. Useful amounts are from about 0.5 to about 10% by weight and preferably from about 2% to about 8% by weight of the gum base composition. The waxes employed herein preferably have a melting point above about 170° F. in order to obtain a consistent chew property. Use of waxes having lower melting points increases tackiness.

A variety of traditional ingredients such as plasticizers or softeners may optionally be added. Such materials are optional and not essential in the present formulation. Such materials include hydrogenated vegetable oils, lanolin, stearic acid, sodium stearate, potassium stearate, glycerine and the like and mixtures thereof. Such materials when incorporated into the gum base obtain a variety of desirable textures and consistency properties. These individual materials are generally employed in amounts of about 15% to about 40% by weight and preferably in amounts of from about 20% to about 35% by weight of the gum base composition. Because of the low molecular weight of these compounds, they are able to penetrate the fundamental structure of the base making it plastic and less viscous.

A unique feature of the inventive formulations is their ability to form a non-adhesive product without the use of filler-texturizing agents. Such agents have been described in the prior art as necessary to impart good lubricant and flavor release properties to non-stick gum base products. The use of such fillers however limits the amount of flavor agent that can be added and therefore lessens the preceived breath freshening quality of the chewing gum. Because of applicants unique combination of ingredients the inventive formulations are prepared in the essential absence of filler-texturizing agents. The absence of filler materials permit the incorporation of higher levels of resins, and elastomers which in turn create higher resistance to softening at higher flavor levels. As such higher levels of flavoring agent can be employed without increasing the plasticizing effect normally accompanying this increased addition. It has been found that 10 to 50% and higher amounts of flavor can be added to the gum bases formulations above that normally employed without modifying the physical texture of the base.

The gum base composition may contain 0 to about 5% filler and preferably 0 to about 3% by weight of the base and most preferably zero.

The manner in which the base constituents are blended is not critical and is performed using standard techniques and equipment known to those skilled in the art. In a typical embodiment a premixture may be prepared by initially softening a previously mixed elastomer composition by agitating it with an elastomer solvent and/or plasticizers, and/or emulsifiers for a period of about 30 minutes to about 120 minutes. Once initial mixing is complete the remaining base constituents may be added in bulk, incrementally or stepwise while the resulting mixture is blended for a further equivalent period of time. Once blending is complete, the remaining chewing gum composition additives may be added to the prepared base to form a final chewing gum composition by standard techniques.

The present chewing gum base may be formulated into a variety of chewing gum products utilizing standard procedures and equipment. A chewing gum composition may be prepared by combining conventional ingredients such as sweeteners, flavors, colorants and the like.

The amount of gum base employed will vary depending on such factors as the type of base used, consistency desired and other components used to make the final product. In general, amounts from about 5% to 45% by weight of the final gum base composition are acceptable with preferred amounts of about 15% to about 25% by weight being useable.

The sweetening agent may be selected from a wide range of materials including water-soluble agents, water-soluble artificial sweeteners, and dipeptide based sweeteners, including mixtures thereof. Without being limited to particular sweeteners, representative illustrations encompass:

A. Water-soluble sweetening agents such as monosaccharides, disaccharides, and polysacchuraides such as xylose, ribose, glucose, mannose, galactose, fructose, dextrose, sucrose, sugar, maltose, partially hydrolyzed starch, or corn syrup slids and sugar alcohols such as sorbitol, xylitol, mannitol and mixtures thereof.

B. Water-soluble artificial sweeteners such as the soluble saccharin salts, i.e., sodium or calcium saccharin salts, cyclamate salts, acesulfam-K and the like, and the free acid form of saccharin.

C. Dipeptide based sweeteners such as L-aspartyl-L-phenylalanine methyl ester and materials described in U.S. Pat. No. 3,492,131 and the like.

In general, the amount of sweetener will vary with the desired amount of sweetners selected for a particular chewing gum. This amount will normally be 0.001% to about 90% by weight when using an easily extractable sweetener. The water-soluble sweeteners described in category A above, are preferably used in amounts of about 25% to about 75% by weight, and most preferably from about 50% to about 65% by weight of the final chewing gum composition. In contrast, the artificial sweeteners described in categories B and C are used in amounts of about 0.005% to about 5.0% and most preferably about 0.05% to about 2.5% by weight of the final chewing gum composition. These amounts are ordinarily necessary to achieve a desired level of sweetness independent from the flavor level achieved from flavor oils.

Flavoring agents well known to the chewing gum art may be added to the chewing gum compositions of the instant invention. These flavoring agents may be chosen from synthetic flavoring liquids and/or oils derived from plants, leaves, flowers, fruits and so forth, and combinations thereof. Representative flavoring liquids include: spearmint oil, cinnamon oil, oil of wintergreen (methylsalicylate) and peppermint oils. Also useful are artificial, natural or synthetic fruit flavors such as citrus oil including lemon, orange, grape, lime and grapefruit and fruit essences including apple, strawberry, cherry, pineapple and so forth.

The amount of flavoring agent employed is normally a matter of preference subject to such factors as flavor type, base type and strength desired. In general, amounts of about 0.05% to about 2.0% by weight of the final chewing gum composition are usable with amounts of about 0.8% to about 1.5% being preferred.

The chewing gum formulations are prepared by conventional methods. An illustrative process involves first melting the gum base at a temperature from about 70° to about 120° C. and mixing the gum base in a kettle with a liquid softener and/or a emulsifier for 2 to 8 minutes. To this mixture ⅔ to ¾ of the sugar ingredients and colors are added and mixing is continued for 1 to 4 minutes. To this mixture the remaining sugar ingredients are added and while mixing is continued, the flavoring agent is slowly added. Mixing is maintained for 1 to 4 minutes. To this mixture a humectant can be added and mixing is continued for 1 to 4 minutes. The gum is discharged from the kettle and formed into its desired shape such as strips, slabs, chunks, balls ropes and/or center filled.

The following examples are given to illustrate the invention, but are not deemed to be limiting thereof. All percentages given throughout the specification are based upon weight unless otherwise indicated, percentages of base components are by weight of the base, whereas chewing gum composition components are by weight of the final chewing gum formulation.

EXAMPLE 1 INVENTIVE RUNS I AND II

This example demonstrates the formation of chewing gum bases according to the invention.

To a kettle is added a premix which is composed of isobutylene-isoprene copolymer, elastomer solvent and waxes. Mix 15 minutes in which time the melted mass reaches approximately 190° F. To the mixture is added in sequence while mixing is continued low molecular weight polyethylene, optional filler, polyvinyl acetate polyisobutylene, plasticizers and glycerol monostearate. The final temperature should range from 180° F. to 210° F. The molten mass is discharged from the kettle into coated pans. The base is allowed to cool and harden before depanning. The ingredients are recited in Table I.

Chewing gum formulations are prepared with the ingredients recited in Table I. The formulations were prepared by first melting the gum base at a temperature from 82° to 94° C. and mixing the gum base (21%) in a kettle with 17% corn syrup and 0.2% softeners. Mixing is continued for approximately 2 minutes to obtain a homogenous mixture. To this mixture is added 59.75% surgar, 0.2% color, 0.65% glycerin, and 1.2% flavor and mixing is continued for approximately 5 minutes.

The gum is then discharged from the kettle and formed into sticks and conditioned to room temperature.

In order to evaluate the chewing gum formulations the formulations were subjected to test panel studies with multiple panelists. The results demonstrated that the formulations did not exhibit any stickiness to with multiple panelists. The results demonstrated that the formulations did not exhibit any stickiness to dental surfaces at intervals of 5 and 15 minutes. The acceptability results of the panel are set forth in Example 4.

TABLE I

|  | Inventive Run I | Inventive Run II |
|---|---|---|
| Isobutylene-Isoprene Copolymer | 6.50% | 6.50% |
| Polyisobutylene | 14.00% | 15.50% |
| PolyVinyl Acetate 15,000–30,000 MW | 28.00% | 28.00% |
| Glyceryl Ester of Partially Hydrogenated Wood Rosin | 6.50% | 6.50% |
| Microcrystalline Wax | 3.00% | 3.00% |
| Low Molecular Weight Polyethylene | 6.50% | 6.50% |
| Glyceryl Monostearate | 5.50% | 6.00% |
| Fats | 28.00% | 28.00% |
| Filler (CaCO$_3$) | 2.00% | — |

EXAMPLE 2 COMPARATIVE RUNS A AND B

This example demonstrates the formation of gum bases. The procedure of Example 1 was repeated with the ingredients recited in Table II. These runs employed formulations having relatively high filler contents. That is, amounts above 5% by weight of the chewing gum base.

Chewing gum formulations were prepared with the ingredients of Runs A and B. The formulations were prepared by first melting the gum base at a temperature from 82° to 94° C. and mixing the gum base (21%) in a kettle with the 17% corn syrup and 0.2% softeners. Mixing is continued for approximately 2 minutes to obtain a homogeneous mixture. To this mixture is added 59.75% sugar, 0.2% color, 0.65% glycerin, and 1.2% flavor and mixing is continued for approximately 5 minutes.

The gum is then discharged from the kettle and formed into sticks and cooled to room temperature.

In order to evaluate the chewing gum formulations, the formulations were subjected to test panel studies wich multiple panelists. The results demonstrated that the formulations exhibited some sticking to dental surfaces at subsequent intervals of 5 and 15 minutes and reduced flavor impact was perceived as well as undesirable chew characteristics. The acceptability results are set forth in Example 4.

TABLE II

|  | Run A | Run B |
|---|---|---|
| Isobutylene-Isoprene Copolymer | 7.48% | 8.64% |
| Polyisobutylene | 10.00% | 19.79% |
| Polyvinyl Acetate | 22.00% | 28.85% |
| Glyceryl Ester of | 7.48% | — |

TABLE II-continued

|  | Run A | Run B |
|---|---|---|
| Partially Hydrogenated Wood Rosin |  |  |
| Glycerol Ester of Polymerized Resin |  | 2.45% |
| Pentaerythritol Ester of Partially Hydrogenated Wood Rosin |  | — |
| Waxes | 7.48% | — |
| Low Molecular Weight Polyethylene | 5.00% |  |
| Glyceryl MonoStearate | 4.50% | 6.92% |
| Fats | 28.00% | 23.42% |
| Filler (CaCO$_3$ or Talc) | 8.06% | 9.96% |

EXAMPLE 3

COMPARATIVE RUNS C, D, AND E

This example demonstrates the formation of various gum bases according to the procedure of Example 1. The ingredients are recited in Table III. These runs employed either relatively high filler levels or ingredients that are considered detrimental to the formulations of the instant invention.

Chewing gum formulations were prepared with the ingredients of Runs C, D and E.

The formulations were prepared by first melting the gum base at a temperature from 82° to 94° C. and mixing the gum base (21%) in a kettle with the corn syrup (17%) and softeners (0.2%). Mixing is continued for approximately 2 minutes to obtain a homogeneous mixture. To this mixture is added 59.75% sugar, 0.2% color, 0.65% glycerin, and 1.2% flavor and mixing is continued for approximately 5 minutes.

The gum is then discharged from the kettle and formed into sticks and cooled to room temperature.

The acceptability results of the panel test are recited in Example 4.

The Run C results showed that tackiness was increased to moderately sticky and chew characteristics were undesirable due to excessive softness.

The Run D results showed an increase in plasticizing that was so severe the gum was extremely tacky and the gum could not be chewed. The gum exhibited disintegration.

The Run E results indicated that the tackiness was increased to moderately sticky.

TABLE III

| Ingredient | Run 1 | Run C | Run D | Run E |
|---|---|---|---|---|
| Isobutylene-Isoprene Copolymer | 6.50% | 7.48% | 7.48% | 7.48% |
| Polyisobutylene | 14.00% | 10.0% | 10.0% | 10.0% |
| Polyvinyl Acetate 15,000–30,000 MW | 28.00% | 22.0% | 22.0 | 22.0 |
| Glyceryl Ester of Partially Hydrogenated Wood Rosin | 6.50% | 7.48% | 7.48% | 7.48% |
| Microcrystalline Wax | 3.00% | 7.48% | 7.48% | 7.48% |
| Low molecular weight polyethylene AC-6 | 6.50% |  | 5.0% | — |
| Glyceryl Monostearate | 5.50% | 4.5% | 4.50% | 4.5% |
| Fats | 28.00 | 28.0% | 28.00% | 28.0 |
| Filler (CaCo$_3$) | 2.00 | 9.5% | — | 13.06% |
| Glyceryl Triacetate | — | 3.56% | 3.56% | — |
| Acetylated Monoglyceride | — | — | 4.5% | — |

EXAMPLE 4

The panel members participating in the test were asked to render overall ratings of the chewing gum sample on the basis of perceived flavor impact and chewing enjoyment as well as its non-stick character. The ratings were based on the following scale.

A rating of 1 indicated that the panel member would definitely want to chew the particular gum. A rating of 2 indicated that the panel member would probably chew the gum. A rating of 3 indicated that the panel member probably would not chew the gum, and a rating of 4 indicated that the panel member definitely would not chew the gum. The results were calculated to give an overall numerical rating for easier comparisons and are not recited in Table IV.

The invention being thus described, it will be obvious that the same may be varied in many ways. Such variations are not to be regarded as a departure from the spirit and scope of the invention and all such modifications are intended to be included within the scope of the following claims.

TABLE IV
CHEWING GUM ADHESIVENESS RATINGS

| Time | Rating No. | Peppermint Gum of Run 1 No. | Peppermint Gum of Run 1 % | Peppermint Gum of Run 2 No. | Peppermint Gum of Run 2 % |
|---|---|---|---|---|---|
| Upon Softening | 1 | 10 | 100.0 | 10 | 100.0 |
|  | 2 | 0 | 0.0 | 0 | 0.0 |
|  | 3 | 0 | 0.0 | 0 | 0.0 |
|  | 4 | 0 | 0.0 | 0 | 0.0 |
| 5 Min. | 1 | 10 | 100.0 | 10 | 100.0 |
|  | 2 | 0 | 0.0 | 0 | 0.0 |
|  | 3 | 0 | 0.0 | 0 | 0.0 |
|  | 4 | 0 | 0.0 | 0 | 0.0 |
| 15 Min. | 1 | 10 | 100.0 | 10 | 100.0 |
|  | 2 | 0 | 0.0 | 0 | 0.0 |
|  | 3 | 0 | 0.0 | 0 | 0.0 |
|  | 4 | 0 | 0.0 | 0 | 0.0 |

| Time | Rating No. | Peppermint Gum of Run A No. | Peppermint Gum of Run A % | Peppermint Gum Run B No. | Peppermint Gum Run B % |
|---|---|---|---|---|---|
| Upon Softening | 1 | 14 | 93.3 | 13 | 86.6 |
|  | 2 | 0 | 0.0 | 1 | 6.7 |
|  | 3 | 1 | 6.7 | 0 | 6.0 |
|  | 4 | 0 | 0.0 | 1 | 6.7 |
| 5 Min. | 1 | 13 | 86.6 | 13 | 86.6 |
|  | 2 | 1 | 6.7 | 1 | 6.7 |
|  | 3 | 1 | 6.7 | 1 | 6.7 |
|  | 4 | 0 | 0.0 | 1 | 6.0 |
| 15 Min. | 1 | 13 | 86.6 | 13 | 86.6 |
|  | 2 | 1 | 6.7 | 0 | 0.0 |
|  | 3 | 1 | 6.7 | 1 | 6.7 |
|  | 4 | 0 | 0.0 | 1 | 6.7 |

What is claimed is:

1. A non-adhesive chewing gum base composition, consisting essentially of, in weight percent
   (a) elastomer in the amount of about 10 to about 30%, wherein the elastomer is selected from the group consisting of synthetic gums, synthetic elastomers, natural gums, natural elastomers and mixtures thereof,
   (b) elastomer solvent in the amount of about 2 to about 18%, wherein the elastomer solvent is selected from the group consisting of pentaerythritol ester of partially hydrogenated wood rosin, pentaerythritol ester of wood resin, glycerol ester of partially dimerized rosin, glycerol ester of polymerized rosin, glycerol ester of tall oil rosin, glycerol ester of wood resin and partially hydrogenated wood rosin and partially hydrogenated methyl ester of rosin; terpene resins including polyterpene and polymers of α-pinene or β-pinine and mixtures thereof, (c) polyvinyl acetate having a medium average molecular weight of 15,000 to 30,000 in the amount of about 15 to about 45%, (d) an emulsifier in the amount of about 2.0 to about 10%, wherein the emulsifier is selected from the group consisting of glycerol monostearate, lecithin, fatty acid monoglycerides, diglycerides, triglycerides, propylene glycol monostearate and mixtures thereof, (e) low molecular weight polyethylene having an average molecular weight of at least 2,000 in the amount of about 0.5 to about 15%, (f) waxes having a melting point above about 170° F. in the amount of about 0.5 to about 10%, wherein the waxes are selected from the group consisting of microcrystalline wax, natural wax, petroleum wax and mixtures thereof, (g) plasticizer in the amount of about 10 to about 40%, wherein the plasticizer is selected from hydrogenated vegetable oils, partially hydrogenated vegetable oils, hydrogenated animal fats, partially hydrogenated animal fats, cocoa butter and mixtures thereof, and (h) fillers in the amount of about 0 to about 5%.

2. The chewing gum composition of claim 1 wherein the elastomer is present in the amount of about 20 to about 28%.

3. The chewing gum base composition of claim 1 wherein the elastomer solvent is present in the amount of about 5 to about 10%.

4. The chewing gum base composition of claim 1 wherein the polyvinyl acetate is present in the amount of about 20 to 30%.

5. The chewing gum base composition of claim 1 wherein the emulsifier is present in the amount of about 4% to about 6%.

6. The chewing gum base composition of claim 1 wherein the polyethylene is present in the amount of about 2 to about 7%.

7. The chewing gum base composition of claim 1 wherein the waxes are present in the amount of about 2% to about 8%.

8. The composition of claim 1 wherein said vegetable oils are selected from soybean oil, cottonseed oil, corn oil, peanut oil, palm oil and mixtures thereof and said animal fats are selected from tallow, lard and mixtures thereof.

9. The chewing gum base composition of claim 1 wherein the plasticizer is present in the amount of about 20 to about 35%.

10. The chewing gum composition of claim 1 wherein the filler is present in the amount of about 0% to about 3%.

11. The chewing gum base composition of claim 1 wherein no fillers are present.

12. The chewing gum composition of claim 1 wherein the composition is a sugar-free composition.

13. A chewing gum composition having breath freshening and longer laster flavor characters which comprises a chewing gum composition containing a flavoring agent and a non-adhesive chewing gum base consisting essentially of in weight percent (a) elastomer in the amount of about 10 to about 30%, wherein the elastomer is selected from the group consisting of synthetic gums, synthetic elastomers, natural gums, natural elastomers and mixtures thereof, (b) elastomer solvent in the amount of about 2 to about 18%, wherein the elastomer solvent is selected from the group consisting of pentaerythritol ester of partially hydrogenated wood rosin, pentaerythritol ester of wood rosin, glycerol ester of partially dimerized rosin, glycerol ester of polymerized rosin, glycerol ester of tall oil rosin, glycerol ester of wood rosin and partially hydrogenated wood rosin and partially hydrogenated methyl ester of rosin; terpene resins including polyterpene and polymers of α-pinene or β-pinine and mixtures thereof, (c) polyvinyl acetate having a medium average molecular weight of 15,000 to 30,000 in the amount of about 15 to about 45%, (d) an emulsifier in the amount of about 2.0 to about 10%, wherein the emulsifier is selected from the group consisting of glycerol monostearate, lecithin, fatty acid monoglycerides, diglycerides, triglycerides, propylene glycol monostearate and mixtures thereof, (e) low molecular weight polyethylene having an average molecular weight of at least 2,000 in the amount of about 0.5 to about 15%, (f) waxes having a melting point above about 170° F. in the amount of about 0.5 to about 10%, wherein the waxes are selected from the group consisting of microcrystalline wax, natural wax, petroleum wax and mixtures thereof, (g) plasticizer in the amount of about 10 to about 40%, wherein the plasticizer is selected from hydrogenated vegetable oils, partially hydrogenated vegetable oils, hydrogenated animal fats, partially hydrogenated animal fats, cocoa butter and mixtures thereof, and (h) fillers in the amount of about 0 to about 5%.

14. The chewing gum composition of claim 13 wherein the flavoring agent is present in the amount of about 0.05% to about 2.0% by weight.

15. The chewing gum composition of claim 13 wherein the flavoring agent is selected from natural or synthetic flavoring agents.

16. The chewing gum composition of claim 13 wherein the chewing gum base is present in the amount of about 15% to about 45% by weight.

17. The chewing gum composition of claim 13 additionally contains a material selected from the group consisting of natural or synthetic gums, sweeteners, coloring agents and mixtures thereof.

18. The chewing gum composition of claim 13 wherein the flavoring agent is selected from the group consisting of peppermint oil, spearmint oil, cinnamon oil, oil of wintergreen, bubble flavor, fruit flavors and mixtures thereof.

19. The chewing gum composition of claim 13 wherein the sweetening agent is selected from the group consisting of water-soluble sweetening agents, water-soluble artificial sweeteners, dipeptide based sweeteners and mixtures thereof.

20. A process for preparing a non-adhesive chewing gum base composition consisting essentially of:

A. providing the following ingredients in amounts expressed in percent by weight:

(a) elastomer in the amount of about 10 to about 30%, wherein the elastomer is selected from the group consisting of synthetic gums, synthetic elastomers, natural gums, natural elastomers and mixtures thereof, (b) elastomer solvent in the amount of about 2 to about 18%, wherein the elastomer solvent is selected from the group consisting of pentaerythritol ester of partially hydrogenated wood rosin, pentaerythritol ester of wood rosin, glycerol ester of partially dimerized rosin, glycerol ester of polymerized rosin, glycerol ester of tall oil rosin, glycerol ester of wood rosin and partially hydrogenated wood rosin and partially hydrogenated methyl ester of rosin; terpene resins including polyterpene and polymers of α-pinene or β-pinine and mixtures thereof, (c) polyvinyl acetate having a medium average molecular weight of 15,000 to 30,000 in the amount of about 15 to about 45%, (d) an emulsifier in the amount of about 2.0 to about 10%, wherein the emulsifier is selected from the group consisting of glycerol monostearate, lecithin, fatty acid monoglycerides, diglycerides, triglycerides, propylene glycol monostearate and mixtures thereof, (e) low molecular weight polyethylene having an average molecular weight of at least 2,000 in the amount of about 0.5 to about 15%, (f) waxes having a melting point above about 170° F. in the amount of about 0.5 to about 10%, wherein the waxes are selected from the group consisting of microcrystalline wax, natural wax, petroleum wax and mixtures thereof, (g) plasticizer in the amount of about 10 to about 40%, wherein the plasticizer is selected from hydrogenated vegetable oils, partially hydrogenated vegetable oils, hydrogenated animal fats, partially hydrogenated animal fats, cocoa butter and mixtures thereof, and (h) fillers in the amount of about 0 to about 5%, B. agitating said elastomer by high shear mixing;

C. adding said elastomer solvent to the elastomer of step B to form a first mixture; and D. adding to said mixture, the remainder of said ingredients;

E. wherein all of said ingredients are mixed with each other under agitation.

* * * * *

UNITED STATES PATENT AND TRADEMARK OFFICE
CERTIFICATE OF CORRECTION

PATENT NO. : 4,518,615

DATED : May 21, 1985

INVENTOR(S) : Subraman R. Cherukuri, et al.

It is certified that error appears in the above-identified patent and that said Letters Patent is hereby corrected as shown below:

Column 11, line 3, "pinine" should read --pinene--.

Column 12, line 14, "pinine" should read --pinene--.

Column 12, line 65 "A." should read --A--.

Column 13, line 15, "pinine" should read --pinene--.

Column 14, line 18, "B." should read --B--.

Column 14, line 19, "C." should read --C--.

Column 14, line 21, "D." should real --D--.

Column 14, line 22, insert --and-- at the end of the line.

Column 14, line 23, "E." should read --E--.

UNITED STATES PATENT AND TRADEMARK OFFICE
CERTIFICATE OF CORRECTION

PATENT NO.   : 4,518,615           Page 2 of 2

DATED        : May 21, 1985

INVENTOR(S)  : Subraman R. Cherukuri, et al.

It is certified that error appears in the above-identified patent and that said Letters Patent is hereby corrected as shown below:

Column 10, line 65, "resin" should read --rosin--.
Column 10, line 68, "resin" should read --rosin--.

Signed and Sealed this

Fifth Day of November 1985

[SEAL]

Attest:

Attesting Officer

DONALD J. QUIGG

Commissioner of Patents and Trademarks